United States Patent
Sha et al.

(10) Patent No.: US 12,551,270 B2
(45) Date of Patent: Feb. 17, 2026

(54) GRAPHICAL CONTACT QUALITY INDICATOR FOR BALLOON CATHETER NAVIGATION

(71) Applicant: Biosense Webster (Israel) Ltd., Yokneam (IL)

(72) Inventors: Qun Sha, Diamond Bar, CA (US); Avigdor Rosenberg, Kiryat Tivon (IL); Eid Adawi, Tur'an (IL); Tushar Sharma, Arcadia, CA (US); Ahmed Abdelaal, Mission Viejo, CA (US); Xiangming Zhang, Irvine, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 569 days.

(21) Appl. No.: 17/848,158

(22) Filed: Jun. 23, 2022

(65) Prior Publication Data

US 2023/0414273 A1   Dec. 28, 2023

(51) Int. Cl.
*A61B 18/14* (2006.01)
*A61B 5/00* (2006.01)
(Continued)

(52) U.S. Cl.
CPC ........ *A61B 18/1492* (2013.01); *A61B 5/0538* (2013.01); *A61B 5/287* (2021.01);
(Continued)

(58) Field of Classification Search
CPC ..... A61B 18/1492; A61B 34/25; A61B 5/287; A61B 5/0538; A61B 5/7435;
(Continued)

(56) References Cited

U.S. PATENT DOCUMENTS

| D123,782 S | 12/1940 | Paul |
|---|---|---|
| 3,316,896 A | 5/1967 | Louis |

(Continued)

FOREIGN PATENT DOCUMENTS

| CN | 101422637 A | 5/2009 |
|---|---|---|
| CN | 102271607 A | 12/2011 |

(Continued)

OTHER PUBLICATIONS

Extended European Search Report and Opinion dated Nov. 23, 2023, from corresponding European Application No. 23180860.1.
(Continued)

*Primary Examiner* — Benjamin J Klein
*Assistant Examiner* — Thien Jason Tran

(57) ABSTRACT

An apparatus for medical treatment includes a probe including multiple electrodes and configured to be inserted in a body cavity of a patient so as to bring the multiple electrodes into contact with tissue in the body cavity. A processor is configured to assess one or more individual contact quality indicators with respect to the contact between each of the multiple electrodes and the tissue, to compute one or more global contact quality measures based on the individual contact quality indicators of the multiple electrodes, to compare the one or more global contact quality measures to a predefined global contact quality criterion, and to display on a display screen an icon indicating whether the global contact quality measures satisfy the predefined global contact quality criterion.

23 Claims, 4 Drawing Sheets

(51) Int. Cl.
*A61B 5/0538* (2021.01)
*A61B 5/287* (2021.01)
*A61B 18/00* (2006.01)
*A61B 34/00* (2016.01)

(52) U.S. Cl.
CPC ............ *A61B 5/7435* (2013.01); *A61B 34/25* (2016.02); *A61B 2018/0022* (2013.01); *A61B 2018/00577* (2013.01); *A61B 2562/0271* (2013.01)

(58) Field of Classification Search
CPC .. A61B 2018/0022; A61B 2018/00577; A61B 2562/0271
See application file for complete search history.

(56) References Cited

U.S. PATENT DOCUMENTS

| | | |
|---|---|---|
| 4,276,874 A | 7/1981 | Wolvek et al. |
| 4,587,975 A | 5/1986 | Salo et al. |
| 4,709,698 A | 12/1987 | Johnston et al. |
| 4,805,621 A | 2/1989 | Heinze et al. |
| 5,178,957 A | 1/1993 | Kolpe et al. |
| 5,429,617 A | 7/1995 | Hammersmark et al. |
| 5,582,609 A | 12/1996 | Swanson et al. |
| 5,584,830 A | 12/1996 | Ladd et al. |
| 5,702,386 A | 12/1997 | Stern et al. |
| 5,718,241 A | 2/1998 | Ben-Haim et al. |
| 5,797,903 A | 8/1998 | Swanson et al. |
| 5,860,974 A | 1/1999 | Abele |
| 5,971,983 A | 10/1999 | Lesh |
| 6,012,457 A | 1/2000 | Lesh |
| 6,024,740 A | 2/2000 | Lesh et al. |
| 6,042,580 A | 3/2000 | Simpson |
| 6,123,718 A | 9/2000 | Tu et al. |
| 6,164,283 A | 12/2000 | Lesh |
| 6,171,275 B1 | 1/2001 | Webster, Jr. |
| 6,176,832 B1 | 1/2001 | Habu et al. |
| 6,198,974 B1 | 3/2001 | Webster, Jr. |
| 6,226,542 B1 | 5/2001 | Reisfeld |
| 6,301,496 B1 | 10/2001 | Reisfeld |
| 6,322,558 B1 | 11/2001 | Taylor et al. |
| 6,380,957 B1 | 4/2002 | Banning |
| 6,402,740 B1 | 6/2002 | Ellis et al. |
| D462,389 S | 9/2002 | Provence et al. |
| 6,471,693 B1 | 10/2002 | Carroll et al. |
| 6,522,930 B1 | 2/2003 | Schaer et al. |
| 6,625,482 B1 | 9/2003 | Panescu et al. |
| 6,656,174 B1 | 12/2003 | Hegde et al. |
| 6,814,733 B2 | 11/2004 | Schwartz et al. |
| 6,893,433 B2 | 5/2005 | Lentz |
| 6,986,744 B1 | 1/2006 | Krivitski |
| 6,987,995 B2 | 1/2006 | Drysen |
| 6,997,924 B2 | 2/2006 | Schwartz et al. |
| 7,142,903 B2 | 11/2006 | Rodriguez et al. |
| 7,156,816 B2 | 1/2007 | Schwartz et al. |
| 7,274,957 B2 | 9/2007 | Drysen |
| 7,340,307 B2 | 3/2008 | Maguire et al. |
| 7,377,906 B2 | 5/2008 | Selkee |
| 7,442,190 B2 | 10/2008 | Abbound et al. |
| 7,536,218 B2 | 5/2009 | Govari et al. |
| 7,591,799 B2 | 9/2009 | Selkee |
| 7,593,760 B2 | 9/2009 | Rodriguez et al. |
| 7,720,517 B2 | 5/2010 | Drysen |
| 7,756,576 B2 | 7/2010 | Levin |
| 7,842,031 B2 | 11/2010 | Abboud et al. |
| 7,853,302 B2 | 12/2010 | Rodriguez et al. |
| 8,000,765 B2 | 8/2011 | Rodriguez et al. |
| 8,021,327 B2 | 9/2011 | Selkee |
| 8,048,032 B2 | 11/2011 | Root et al. |
| 8,231,617 B2 | 7/2012 | Satake |
| 8,267,932 B2 | 9/2012 | Baxter et al. |
| 8,275,440 B2 | 9/2012 | Rodriguez et al. |
| 8,348,888 B2 | 1/2013 | Selkee |
| 8,357,152 B2 | 1/2013 | Govari et al. |
| D682,289 S | 5/2013 | DiJulio et al. |
| D682,291 S | 5/2013 | Baek et al. |
| 8,456,182 B2 | 6/2013 | Bar-Tal et al. |
| D690,318 S | 9/2013 | Kluttz et al. |
| D694,652 S | 12/2013 | Tompkin |
| 8,641,709 B2 | 2/2014 | Sauvageau et al. |
| 8,721,590 B2 | 5/2014 | Seward et al. |
| 8,777,161 B2 | 7/2014 | Pollock et al. |
| D716,340 S | 10/2014 | Bresin et al. |
| 8,852,181 B2 | 10/2014 | Malecki et al. |
| D720,766 S | 1/2015 | Mandal et al. |
| D721,379 S | 1/2015 | Moon et al. |
| D724,618 S | 3/2015 | Shin |
| 8,998,893 B2 | 4/2015 | Avitall |
| D729,263 S | 5/2015 | Ahn et al. |
| 9,089,350 B2 | 7/2015 | Willard |
| D736,780 S | 8/2015 | Wang |
| 9,126,023 B1 | 9/2015 | Sahatjian et al. |
| D740,308 S | 10/2015 | Kim et al. |
| D743,424 S | 11/2015 | Danielyan et al. |
| D744,000 S | 11/2015 | Villamor et al. |
| 9,173,758 B2 | 11/2015 | Brister et al. |
| D747,742 S | 1/2016 | Fan et al. |
| D750,644 S | 3/2016 | Bhutani et al. |
| 9,283,034 B2 | 3/2016 | Katoh et al. |
| 9,289,141 B2 | 3/2016 | Lowery et al. |
| D753,690 S | 4/2016 | Vazquez et al. |
| 9,320,631 B2 | 4/2016 | Moore et al. |
| D757,113 S | 5/2016 | Hellman et al. |
| 9,345,540 B2 | 5/2016 | Mallin et al. |
| D759,673 S | 6/2016 | Looney et al. |
| D759,675 S | 6/2016 | Looney et al. |
| D764,500 S | 8/2016 | Wang |
| D765,709 S | 9/2016 | Gagnier |
| D767,616 S | 9/2016 | Jones et al. |
| D768,696 S | 10/2016 | Gagnier |
| D783,037 S | 4/2017 | Hariharan et al. |
| 9,655,677 B2 | 5/2017 | Salahieh et al. |
| D791,805 S | 7/2017 | Segars |
| 9,795,442 B2 | 10/2017 | Salahieh et al. |
| 9,907,610 B2 | 3/2018 | Beeckler et al. |
| 9,956,035 B2 | 5/2018 | Govari et al. |
| D861,717 S | 10/2019 | Brekke et al. |
| 10,688,278 B2 | 6/2020 | Beeckler et al. |
| 11,006,902 B1 | 5/2021 | Bonyak et al. |
| 2001/0031961 A1 | 10/2001 | Hooven |
| 2002/0002369 A1 | 1/2002 | Hood |
| 2002/0065455 A1 | 5/2002 | Ben-Haim et al. |
| 2002/0068931 A1 | 6/2002 | Wong et al. |
| 2002/0077627 A1 | 6/2002 | Johnson et al. |
| 2002/0160134 A1 | 10/2002 | Ogushi et al. |
| 2003/0018327 A1 | 1/2003 | Truckai et al. |
| 2003/0028183 A1 | 2/2003 | Sanchez et al. |
| 2003/0050637 A1 | 3/2003 | Maguire et al. |
| 2003/0060820 A1 | 3/2003 | Maguire et al. |
| 2003/0144658 A1 | 7/2003 | Schwartz et al. |
| 2004/0078036 A1* | 4/2004 | Keidar ................... A61B 34/20 606/41 |
| 2004/0122445 A1 | 6/2004 | Butler et al. |
| 2004/0147920 A1 | 7/2004 | Keidar |
| 2004/0225285 A1 | 11/2004 | Gibson |
| 2005/0070887 A1 | 3/2005 | Taimisto et al. |
| 2005/0119686 A1 | 6/2005 | Clubb |
| 2006/0013595 A1 | 1/2006 | Trezza et al. |
| 2006/0106375 A1 | 5/2006 | Werneth et al. |
| 2006/0135953 A1 | 6/2006 | Kania et al. |
| 2007/0071792 A1 | 3/2007 | Varner et al. |
| 2007/0080322 A1 | 4/2007 | Walba |
| 2007/0083194 A1 | 4/2007 | Kunis et al. |
| 2007/0287994 A1 | 12/2007 | Patel |
| 2008/0018891 A1 | 1/2008 | Hell et al. |
| 2008/0021313 A1 | 1/2008 | Eidenschink et al. |
| 2008/0051707 A1 | 2/2008 | Phan et al. |
| 2008/0140072 A1 | 6/2008 | Stangenes et al. |
| 2008/0183132 A1 | 7/2008 | Davies et al. |
| 2008/0188912 A1 | 8/2008 | Stone et al. |
| 2008/0202637 A1 | 8/2008 | Hector et al. |
| 2008/0208186 A1 | 8/2008 | Slater |
| 2008/0249463 A1 | 10/2008 | Pappone et al. |

(56) References Cited

U.S. PATENT DOCUMENTS

| | | |
|---|---|---|
| 2008/0262489 A1 | 10/2008 | Steinke |
| 2008/0281312 A1 | 11/2008 | Werneth et al. |
| 2009/0163890 A1 | 6/2009 | Clifford et al. |
| 2009/0182318 A1 | 7/2009 | Abboud et al. |
| 2009/0270850 A1 | 10/2009 | Zhou et al. |
| 2010/0069836 A1 | 3/2010 | Satake |
| 2010/0114269 A1 | 5/2010 | Wittenberger et al. |
| 2010/0204560 A1 | 8/2010 | Salahieh et al. |
| 2010/0256629 A1 | 10/2010 | Wylie et al. |
| 2010/0324552 A1 | 12/2010 | Kauphusman et al. |
| 2011/0118632 A1 | 5/2011 | Sinelnikov et al. |
| 2011/0130648 A1 | 6/2011 | Beeckler et al. |
| 2011/0282338 A1 | 11/2011 | Fojtik |
| 2011/0295248 A1 | 12/2011 | Wallace et al. |
| 2011/0301587 A1 | 12/2011 | Deem et al. |
| 2011/0313286 A1 | 12/2011 | Whayne et al. |
| 2012/0019107 A1 | 1/2012 | Gabl et al. |
| 2012/0029511 A1 | 2/2012 | Smith et al. |
| 2012/0065503 A1 | 3/2012 | Rogers et al. |
| 2012/0071870 A1 | 3/2012 | Salahieh et al. |
| 2012/0079427 A1 | 3/2012 | Carmichael et al. |
| 2012/0101413 A1 | 4/2012 | Beetel et al. |
| 2012/0101538 A1 | 4/2012 | Ballakur et al. |
| 2012/0143177 A1 | 6/2012 | Avitall |
| 2012/0143293 A1 | 6/2012 | Mauch et al. |
| 2012/0191079 A1 | 7/2012 | Moll et al. |
| 2012/0209260 A1 | 8/2012 | Lambert et al. |
| 2013/0085360 A1 | 4/2013 | Grunewald |
| 2013/0090649 A1 | 4/2013 | Smith et al. |
| 2013/0109982 A1 | 5/2013 | Sato et al. |
| 2013/0150693 A1 | 6/2013 | D'Angelo et al. |
| 2013/0165916 A1 | 6/2013 | Mathur et al. |
| 2013/0165941 A1 | 6/2013 | Murphy |
| 2013/0165990 A1 | 6/2013 | Mathur et al. |
| 2013/0169624 A1 | 7/2013 | Bourier et al. |
| 2013/0261692 A1 | 10/2013 | Cardinal et al. |
| 2013/0274562 A1 | 10/2013 | Ghaffari et al. |
| 2013/0274658 A1 | 10/2013 | Steinke et al. |
| 2013/0282084 A1 | 10/2013 | Mathur et al. |
| 2013/0318439 A1 | 11/2013 | Landis et al. |
| 2014/0012242 A1 | 1/2014 | Lee et al. |
| 2014/0018788 A1 | 1/2014 | Engelman et al. |
| 2014/0031813 A1 | 1/2014 | Tellio et al. |
| 2014/0058197 A1 | 2/2014 | Salahieh et al. |
| 2014/0121470 A1 | 5/2014 | Scharf et al. |
| 2014/0148805 A1 | 5/2014 | Stewart et al. |
| 2014/0227437 A1 | 8/2014 | DeBoer et al. |
| 2014/0243821 A1 | 8/2014 | Salahieh et al. |
| 2014/0275993 A1 | 9/2014 | Ballakur |
| 2014/0276756 A1 | 9/2014 | Hill |
| 2014/0276811 A1 | 9/2014 | Koblish et al. |
| 2014/0288546 A1 | 9/2014 | Sherman et al. |
| 2014/0330266 A1 | 11/2014 | Thompson et al. |
| 2014/0357956 A1 | 12/2014 | Salahieh et al. |
| 2015/0005799 A1 | 1/2015 | Lindquist et al. |
| 2015/0025532 A1 | 1/2015 | Hanson et al. |
| 2015/0025533 A1 | 1/2015 | Groff et al. |
| 2015/0057655 A1 | 2/2015 | Osypka |
| 2015/0067512 A1 | 3/2015 | Roswell |
| 2015/0080883 A1 | 3/2015 | Haverkost et al. |
| 2015/0105774 A1 | 4/2015 | Lindquist et al. |
| 2015/0112256 A1 | 4/2015 | Byrne et al. |
| 2015/0112321 A1 | 4/2015 | Cadouri |
| 2015/0119875 A1 | 4/2015 | Fischell et al. |
| 2015/0141982 A1 | 5/2015 | Lee |
| 2015/0157382 A1 | 6/2015 | Avitall et al. |
| 2015/0216591 A1 | 8/2015 | Cao et al. |
| 2015/0216650 A1 | 8/2015 | Shaltis |
| 2015/0265329 A1 | 9/2015 | Lalonde et al. |
| 2015/0265339 A1 | 9/2015 | Lindquist et al. |
| 2015/0265812 A1 | 9/2015 | Lalonde |
| 2015/0272667 A1 | 10/2015 | Govari et al. |
| 2015/0327805 A1 | 11/2015 | Ben-Haim |
| 2015/0341752 A1 | 11/2015 | Flynn |
| 2016/0000499 A1 | 1/2016 | Lennox et al. |
| 2016/0051321 A1 | 2/2016 | Salahieh et al. |
| 2016/0085431 A1 | 3/2016 | Kim et al. |
| 2016/0106499 A1 | 4/2016 | Ogata et al. |
| 2016/0166306 A1 | 6/2016 | Pageard |
| 2016/0175041 A1 | 6/2016 | Govari et al. |
| 2016/0196635 A1 | 7/2016 | Cho et al. |
| 2016/0256305 A1 | 9/2016 | Longo et al. |
| 2016/0374748 A9 | 12/2016 | Salahieh et al. |
| 2017/0042614 A1 | 2/2017 | Salahieh et al. |
| 2017/0042615 A1 | 2/2017 | Salahieh et al. |
| 2017/0080192 A1 | 3/2017 | Giasolli et al. |
| 2017/0143359 A1 | 5/2017 | Nguyen et al. |
| 2017/0164464 A1 | 6/2017 | Weinkam et al. |
| 2017/0202614 A1* | 7/2017 | Gross ................ A61B 5/061 |
| 2017/0311829 A1 | 11/2017 | Beeckler et al. |
| 2017/0311893 A1 | 11/2017 | Beeckler et al. |
| 2017/0312022 A1 | 11/2017 | Beeckler et al. |
| 2017/0347896 A1 | 12/2017 | Keyes et al. |
| 2018/0074693 A1 | 3/2018 | Jones et al. |
| 2018/0110562 A1 | 4/2018 | Govari et al. |
| 2018/0125575 A1 | 5/2018 | Schwartz et al. |
| 2018/0256247 A1 | 9/2018 | Govari et al. |
| 2018/0280080 A1 | 10/2018 | Govari et al. |
| 2018/0333162 A1 | 11/2018 | Saab |
| 2018/0368927 A1 | 12/2018 | Lyons et al. |
| 2019/0038349 A1* | 2/2019 | Koblish ............. A61B 5/6885 |
| 2019/0059818 A1 | 2/2019 | Herrera et al. |
| 2019/0060622 A1 | 2/2019 | Beeckler |
| 2019/0143079 A1 | 5/2019 | Beeckler et al. |
| 2019/0175262 A1 | 6/2019 | Govari et al. |
| 2019/0175263 A1 | 6/2019 | Altmann et al. |
| 2019/0183567 A1 | 6/2019 | Govari et al. |
| 2019/0201669 A1 | 7/2019 | Govari et al. |
| 2019/0217065 A1 | 7/2019 | Govari et al. |
| 2019/0297441 A1 | 9/2019 | Dehe et al. |
| 2019/0298441 A1 | 10/2019 | Clark et al. |
| 2019/0365451 A1 | 12/2019 | Jung, Jr. |
| 2020/0001054 A1 | 1/2020 | Jimenez et al. |
| 2020/0015693 A1 | 1/2020 | Beeckler et al. |
| 2020/0085497 A1 | 3/2020 | Zhang et al. |
| 2020/0155226 A1 | 5/2020 | Valls et al. |
| 2020/0229866 A1* | 7/2020 | Harlev ............ A61B 18/1492 |
| 2021/0045805 A1* | 2/2021 | Govari ............... A61B 5/6858 |
| 2021/0169567 A1 | 6/2021 | Govari et al. |
| 2022/0192604 A1* | 6/2022 | Palti ................... A61B 5/283 |

FOREIGN PATENT DOCUMENTS

| | | |
|---|---|---|
| CN | 102458566 A | 5/2012 |
| CN | 203539434 U | 4/2014 |
| CN | 104244856 A | 12/2014 |
| CN | 104546117 A | 4/2015 |
| CN | 105105844 A | 12/2015 |
| CN | 105473091 A | 4/2016 |
| CN | 105473093 A | 4/2016 |
| EP | 0779059 A1 | 6/1997 |
| EP | 1790304 A2 | 5/2007 |
| EP | 2749214 A1 | 7/2014 |
| EP | 2865350 A2 | 4/2015 |
| EP | 2875790 A2 | 5/2015 |
| EP | 3238646 A2 | 11/2017 |
| EP | 3238648 A1 | 11/2017 |
| EP | 3251622 A1 | 12/2017 |
| EP | 3300680 A1 | 4/2018 |
| EP | 3315087 A1 | 5/2018 |
| EP | 3332727 A2 | 6/2018 |
| EP | 3571983 A2 | 11/2019 |
| EP | 3586778 A1 | 1/2020 |
| EP | 3653153 A1 | 5/2020 |
| JP | H06261951 A | 9/1994 |
| JP | H1176233 A | 3/1999 |
| JP | 2000504242 A | 4/2000 |
| JP | 2005052424 A | 3/2005 |
| JP | 2010507404 A | 3/2010 |
| JP | 2012024156 A | 2/2012 |
| JP | 2013013726 A | 1/2013 |
| JP | 2013078587 A | 5/2013 |
| JP | 2013529109 A | 7/2013 |
| JP | 2014529419 A | 11/2014 |

(56) References Cited

FOREIGN PATENT DOCUMENTS

| | | | |
|---|---|---|---|
| JP | 2015503365 A | 2/2015 |
| JP | 2015100706 A | 6/2015 |
| JP | 2015112113 A | 6/2015 |
| JP | 2015112114 A | 6/2015 |
| JP | 2015518776 A | 7/2015 |
| JP | D1546387 S | 3/2016 |
| JP | 2016515442 A | 5/2016 |
| JP | 2016116863 A | 6/2016 |
| JP | D1715607 S | 5/2022 |
| JP | D1748776 S | 7/2023 |
| KR | D300896938 S | 2/2017 |
| WO | 0056237 A2 | 9/2000 |
| WO | 02102231 A2 | 12/2002 |
| WO | 2005041748 A2 | 5/2005 |
| WO | 2008049087 A2 | 4/2008 |
| WO | 2011143468 A2 | 11/2011 |
| WO | 2013049601 A2 | 4/2013 |
| WO | 2013052919 A2 | 4/2013 |
| WO | 2013154776 A2 | 10/2013 |
| WO | 2014168987 A1 | 10/2014 |
| WO | 2015049784 A1 | 4/2015 |
| WO | 2016183337 A2 | 11/2016 |
| WO | 2016210437 A1 | 12/2016 |
| WO | 2017024306 A1 | 2/2017 |
| WO | 2017087549 A1 | 5/2017 |
| WO | 2018106569 A1 | 6/2018 |
| WO | 2018129133 A1 | 7/2018 |
| WO | 2019095020 A1 | 5/2019 |
| WO | 2020072749 A1 | 4/2020 |
| WO | WO 2021/089569 A1 | 5/2021 |

OTHER PUBLICATIONS

Angela O., "AF Symposium 2017: First-in-Man Study Shows Promising Results with a Multi-Electrode Radiofrequency Balloon for Paroxysmal AF Treatment," Cardiac Rhythm News, Jan. 20, 2017, 2 Pages, [Retrieved on Dec. 16, 2020] Retrieved from URL: https://cardiacrhythmnews.com/fist-in-man-study-shows-promising-results-with-a-multi-electrode-radiofrequency-balloon-for-paroxysmal-af-treatment/.
Casella M., et al., "Ablation Index as a Predictor of Long-Term Efficacy in Premature Ventricular Complex Ablation: A Regional Target Value Analysis," Heart Rhythm Society, Jun. 2019, vol. 16, No. 6, pp. 888-895.
Co-Pending U.S. Appl. No. 14/578,807, filed Dec. 22, 2014, 21 pages.
Das M., et al., "Ablation Index, a Novel Marker of Ablation Lesion Quality: Prediction of Pulmonary Vein Reconnection at Repeat Electrophysiology Study and Regional Differences in Target Values," Europace, 2017, Published Online May 31, 2016, vol. 19, pp. 775-783.
Dorobantu M., et al., "Oral Anticoagulation During Atrial Fibrillation Ablation: Facts and Controversies," Cor et Vasa, 2013, Accepted on Dec. 3, 2012, vol. 55, No. 2, pp. e101-e106, Retrieved from URL: https://www.sciencedirect.com/science/article/pii/S0010865012001415.
Extended European Search Report for Application No. EP17168513.4 mailed Sep. 18, 2017, 11 pages.
Extended European Search Report for European Application No. 15201723.2, mailed May 11, 2016, 07 Pages.
Extended European Search Report for European Application No. 17168393.1 mailed Dec. 15, 2017, 12 Pages.
Extended European Search Report for European Application No. 17168518.3, mailed Sep. 20, 2017, 9 Pages.
Extended European Search Report for European Application No. 17173893.3, mailed Nov. 6, 2017, 8 Pages.
Extended European Search Report for European Application No. 17201434.2, mailed Feb. 1, 2018, 10 Pages.
Extended European Search Report for European Application No. 17205876.0, mailed Jun. 1, 2018, 13 Pages.
Extended European Search Report for European Application No. 19177365.4, mailed Nov. 8, 2019, 07 Pages.
Extended European Search Report for European Application No. 19183327.6, mailed Nov. 21, 2019, 8 Pages.
Extended European Search Report for European Application No. 20153872.5, mailed May 7, 2020, 9 Pages.
Extended European Search Report for European Application No. 20195648.9, mailed Feb. 12, 2021, 8 Pages.
Fornell D., "Multi-Electrode RF Balloon Efficient for Acute Pulmonary Vein Isolation," Diagnostic and Interventional Cardiology, May 17, 2017, 3 Pages, [Retrieved on Dec. 16, 2020] Retrieved from URL: www.dicardiology.com/article/multi-electrode-rf-balloon-efficient-acute-pulmonary-vein-isolation.
Haines D.E., et al., "The Promise of Pulsed Field Ablation," Dec. 2019, vol. 19, No. 12, 10 pages.
Honarbakhsh S., et al., "Radiofrequency Balloon Catheter Ablation for Paroxysmal Atrial Fibrillation, Radiance Study—a UK experience," EP Europace, Oct. 2017, vol. 19, No. 1, p. i21, 3 Pages.
International Search Report and Written Opinion for International Application No. PCT/IB2019/052313, mailed Jul. 22, 2019, 8 Pages.
International Search Report and Written Opinion for International Application No. PCT/IB2019/056381, mailed Dec. 17, 2019, 10 pages.
International Search Report and Written Opinion for International Application No. PCT/IB2019/057743, mailed Dec. 6, 2019, 16 Pages.
International Search Report and Written Opinion issued in corresponding International Application No. PCT/IB2019/057742, dated Nov. 28, 2019, 18 Pages.
Nagashima K., et al., "Hot Balloon Versus Cryoballoon Ablation for Atrial Fibrillation," Circulation: Arrhythmia and Electrophysiology, May 2018, vol. 11, No. 5, e005861, 9 Pages.
Napoli N., et al., "For Atrial Fibrillation Ablation, Newer Anticoagulant Reduces Major Bleeds," American College of Cardiology, Mar. 19, 2017, 4 Pages, [Retrieved on Jan. 21, 2022] Retrieved from URL: https://www.acc.org/about-acc/press-releases/2017/03/18/08/47/sun-1045am-for-atrial-fibrillation-ablation-newer-anticoagulant-reduces-major-bleeds.
Okano T., et al., "Wire Perforation Causing Cardiopulmonary Arrest During Radiofrequency Hot Balloon Ablation for Pulmonary Vein Isolation," Journal of Cardiology Cases, Feb. 15, 2019, vol. 19, No. 5, pp. 169-172.
Partial European Search Report for European Application No. 17168393.1 mailed Sep. 13, 2017, 13 Pages.
Partial European Search Report for European Application No. 17205876.0, mailed Feb. 22, 2018, 10 Pages.
Reddy V.Y., et al., "Balloon Catheter Ablation to Treat Paroxysmal Atrial Fibrillation: What is the Level of Pulmonary Venous Isolation?," Heart Rhythm, Mar. 2008, vol. 5, No. 3, pp. 353-360, 3 Pages.
Winkle R.A., et al., "Atrial Fibrillation Ablation Using Open-Irrigated Tip Radiofrequency: Experience with Intraprocedural Activated Clotting Times ≤ 210 Seconds," Heart Rhythm, Jun. 2014, Epub Mar. 27, 2014, vol. 11, No. 6, pp. 963-968.
Youtube:, "Intensity™ CX4 Professional E-Stim/ Ultrasound Combo," Dec. 22, 2015, 1 Page, [Retrieved on Nov. 19, 2020], Retrieved from URL: https://www.youtube.com/watch?v=76s1QKMWJME].
Youtube: "New Interface TactiCath Contact Force Ablation Catheter," Nov. 26, 2013, 1 Pages, [Retrieved on Nov. 19, 2020], Retrieved from URL: https: /Awww.youtube.com/watch?v=aYvYO8Hpylg].
English Translation of Notification (Search Report) dated Feb. 27, 2024, from Japanese Design Application No. 2023-022313.
Official Gazette HH29407781 dated Mar. 10, 2017, of Korean Design & Trademark Publication 30-0896938.
Official Gazette No. HC24001143 dated May 16, 2024, "Docomo Smartphone REGZA phone T-01C", p. 22.
Official Gazette No. HJ28132682 dated Dec. 14, 2016, "JustSystems Corporation, Published on the website", pp. 1-10.
Official Gazette No. HJ31154777 dated Nov. 4, 2019, "uLektz Learning Solutions Pvt. Ltd, Published on the websit", pp. 1-4.
Official Gazette No. HJ25276056 dated Oct. 21, 2013, "JustSystems Corporation, Published on the website", pp. 1-4.

(56) References Cited

OTHER PUBLICATIONS

Official Gazette No. RJ02089107 dated May 22, 2020, "Administration de l' environnement, Published on the website", pp. 1-4.
English Translation of Notification (Search Report) dated Jun. 4, 2024, from Japanese Design Application No. 2023-005534.
English Translation of Notification (Search Report) dated Jun. 4, 2024, from Japanese Design Application No. 2023-0223314.

\* cited by examiner

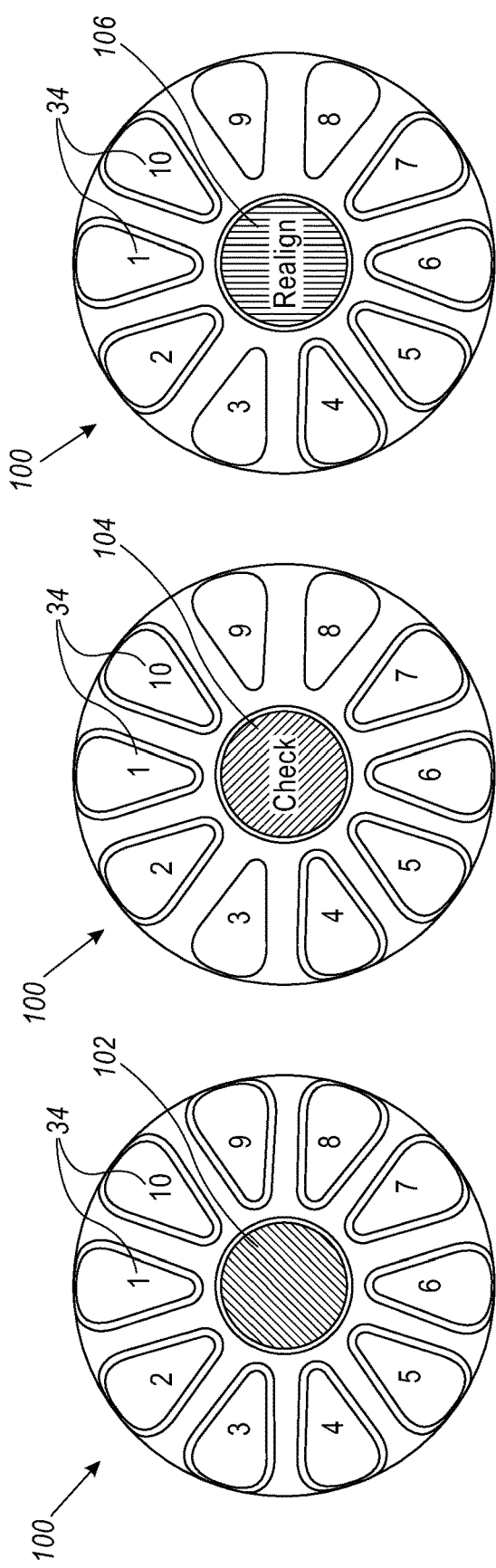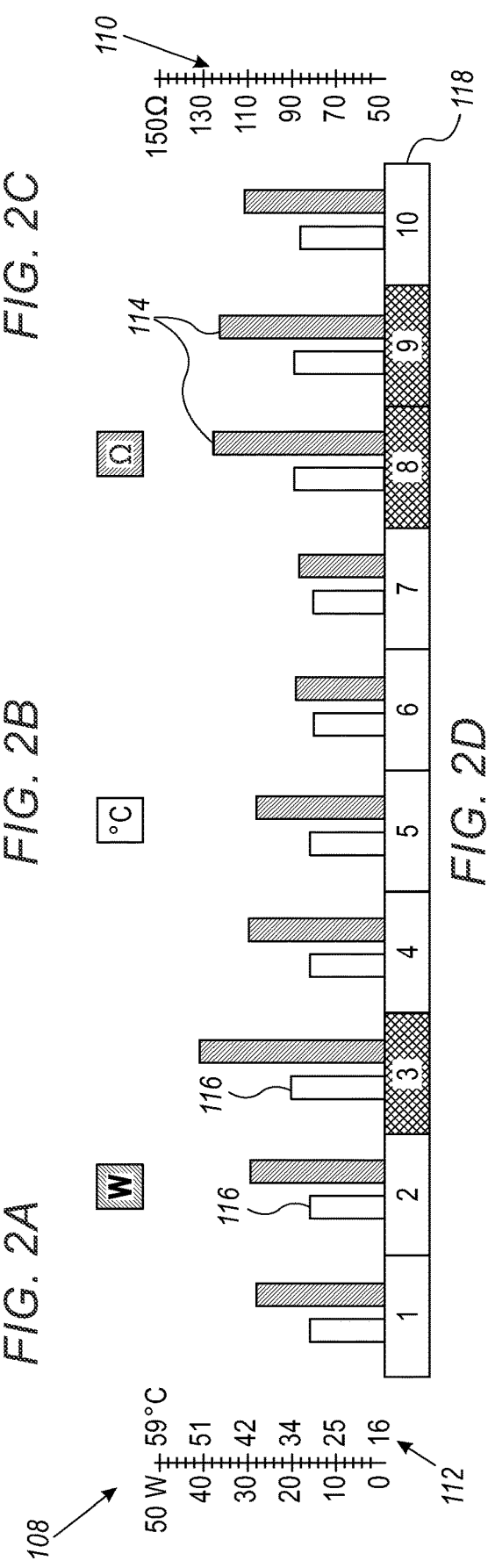
FIG. 2A  FIG. 2B  FIG. 2C  FIG. 2D

GRAPHICAL CONTACT QUALITY INDICATOR FOR BALLOON CATHETER NAVIGATION

FIELD OF THE DISCLOSURE

The present disclosure relates generally to monitoring medical probes, and particularly to monitoring cardiac multi-electrode electrophysiological sensing and ablation catheters using a graphical user interface (GUI).

BACKGROUND

Radio frequency ablation (RFA) is a soft tissue ablation technique, wherein the ablation is done by inserting a catheter or thin probe into the tissue, with electromagnetic radiation radiating from the tip of the catheter. In RFA, a high-power alternating current is applied to tissue so that the heat generated by the current ablates the tissue. RFA is applied, for example, in ablating electrical conduction pathways of the heart, tumors, and other dysfunctional tissues. RFA typically uses currents with amplitude in the range of 0 to 200 V and with frequency in the range of 350-500 kHz.

Irreversible electroporation (IRE) is another soft tissue ablation technique that applies, through a probe that is in contact with or in close proximity to the tissue, short pulses of strong electrical fields to create permanent and hence lethal nanopores in the cell membrane, thus disrupting the cellular homeostasis (internal physical and chemical conditions). Cell death following IRE results from apoptosis (programmed cell death) and not necrosis (cell injury, which results in the destruction of a cell through the action of its own enzymes) as in all other thermal or radiation-based ablation techniques. IRE is commonly used in tumor ablation in regions where precision and conservation of the extracellular matrix, blood flow and nerves are of importance.

U.S. Pat. No. 11,006,902 describes a system that includes a display, an input device, and a processor. The processor is configured to present to a user, on the display, a GUI that illustrates multiple electrodes disposed on an expandable frame of a multi-electrode catheter, and indicates which of the electrodes is active and which of the electrodes is inactive. The processor is further configured to (a) receive, via the input device first user input that chooses between a single-electrode-selection mode and a fan-selection mode, (b) when in the single-electrode-selection mode, receive via the input device second user input that specifies for activation or deactivation individual ones of the electrodes, and (c) when in the fan-selection mode, receive via the input device third user input that specifies for activation or deactivation an angular sector including two or more of the electrodes, and activate and deactivate the electrodes responsively to the first, second and third user inputs.

United States Patent Application Publication 2021/089569 describes devices, systems, and methods for guiding a balloon therapy procedure by generating and outputting a visualization of the volumetric position of a balloon within an anatomical cavity are provided. For example, in one embodiment, a processor circuit is configured to control a plurality of electrodes to detect an electromagnetic field within the anatomical cavity, and determine, based on the detected electromagnetic field and a geometrical parameter associated with the balloon (e.g., size, shape of the balloon), a location of the balloon within the anatomical cavity. The processor circuit outputs a signal representation of a visualization of the balloon to guide placement of the therapeutic balloon. In some embodiments, the visualization is output to a display with a map of the anatomical cavity. The visualization may be updated based on detected movement of the balloon to provide a real time view of the location of the balloon within the anatomical cavity.

U.S. Pat. No. 6,625,482 describes a graphical user interface (GUI) for assisting medical personnel in interpreting data collected by a multiple electrode catheter deployed within the body. The GUI generates and displays an image of the multiple electrode catheter. By manipulating appropriate controls, the medical personnel are able to change the orientation of the displayed image until it matches the orientation of the actual multiple electrode catheter as seen on a fluoroscope. Afterwards, the medical personnel can determine the relative position and orientation of the catheter by reference to the GUI generated image. To aid in interpreting data recovered by the catheter, the individual electrodes and splines are highlighted and labeled. Electrodes recovering particular types of physiological waveforms can be automatically identified and highlighted. Comments and anatomic landmarks can be inserted where desired to further assist in interpreting data. Views from various, virtual fluoro-angles can be obtained, and various images can be recorded, stored and printed. The position of a roving electrode can also be indicated.

The present disclosure will be more fully understood from the following detailed description of the examples thereof, taken together with the drawings in which:

BRIEF DESCRIPTION OF THE DRAWINGS

FIGS. 2A-2D are schematic representations of graphical windows on a display screen, in accordance with an example of the disclosure;

DETAILED DESCRIPTION OF EXAMPLES

Figure 1:
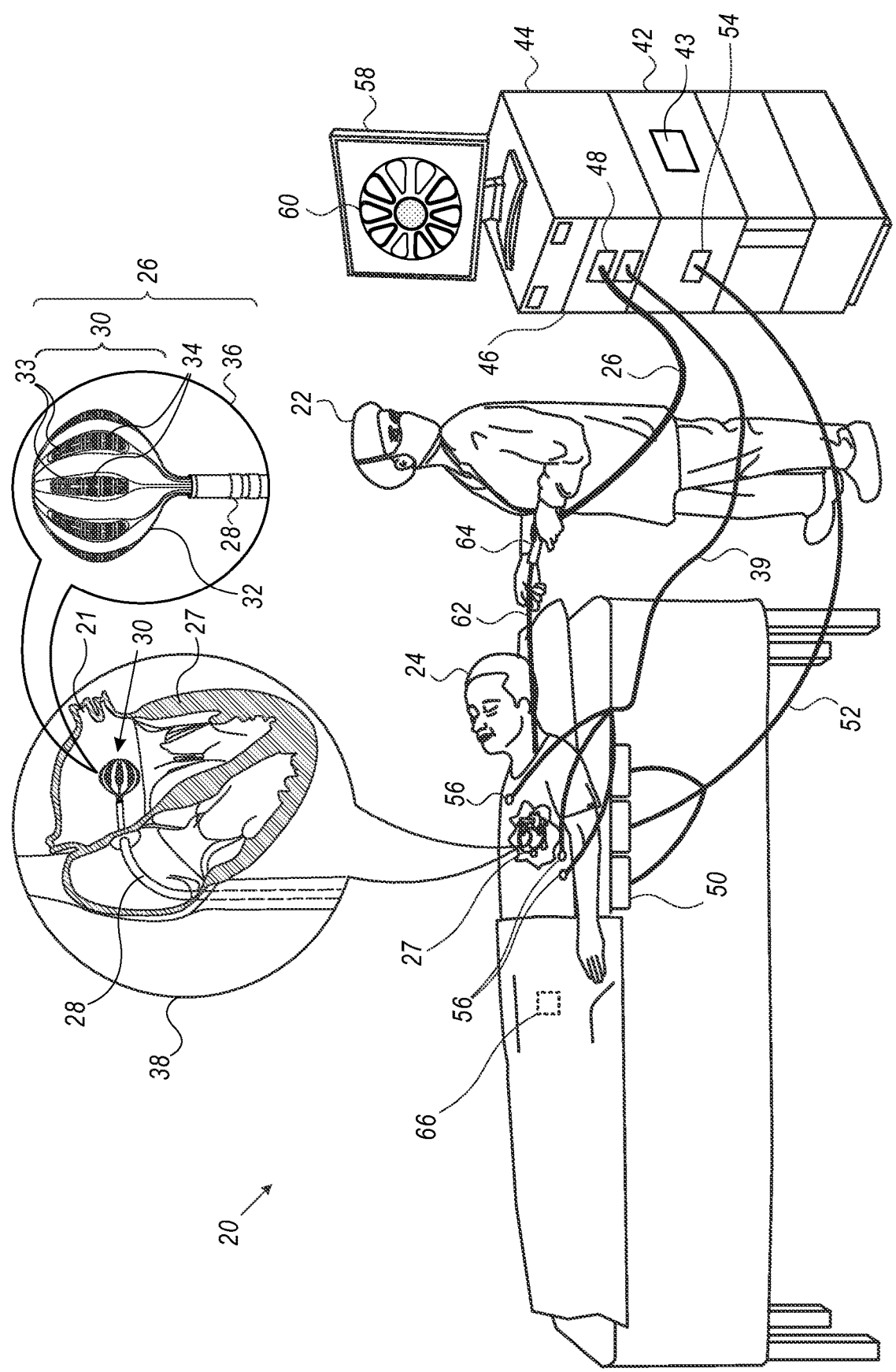
FIG. 1 is a schematic pictorial illustration of a medical apparatus in the course of a unipolar RFA procedure, in accordance with an example of the disclosure.

Some cardiac ablation procedures use a balloon catheter, which has a balloon at its distal end and electrodes arrayed around the surface of the balloon. The balloon is inflated within a body cavity, such as a chamber of the heart, and the electrodes are then brought into contact with the tissue that is to be ablated. Alternatively, other types of catheters, such as a basket catheter or a lasso catheter, may be used.

Ablation may be carried out in either a bipolar mode, in which the ablation currents flow from one ablation electrode to another on the same catheter, or a unipolar mode, in which the ablation currents flow between the ablation electrodes on the catheter and an external electrode, or "return patch." The return patch is typically fixed to the body surface of the subject, for example on the skin of the subject's torso, with an electrical return connection to an RF signal generator. For example, to treat atrial fibrillation, a balloon catheter can be used to ablate the ostium of one or more of the pulmonary veins (PV) in a patient's left atrium. A correctly performed ablation produces a contiguous lesion around the circumference of the ostium, thus electrically isolating the left atrium from the pulmonary veins, where most of the abnormal electrical activity promoting atrial fibrillation originates.

However, it may be difficult for the physician performing the ablation procedure to ascertain that the balloon catheter is aligned properly in the ostium, with all the electrodes of the balloon in good contact with the tissue of the ostium, i.e., that the balloon optimally seals the PV ostium. If one or more of the electrodes are in insufficient contact with the tissue (even if still touching or nearly touching the tissue), there may be gaps in the lesion formed by the ablation around the ostium, and the lesion will thus not completely isolate the left atrium from the pulmonary veins.

In a more extreme case, an electrode may not contact the tissue at all, but may rather be immersed in a layer of blood between the electrode and the tissue. In this case, ablation through this specific electrode may cause the blood in its vicinity to coagulate into a blood clot, which may then travel in the circulatory system of the patient and cause a hazardous thrombosis.

Prior to ablation, there is thus a need for a clear indication for the physician as to the quality of contact between each of the electrodes of the balloon catheter and the tissue of the ostium. This indication should assure the physician of the global quality of balloon electrode contact and balloon alignment, i.e., that the balloon is coaxially aligned with the PV.

Some of the examples that are described herein address this problem by providing a graphical user interface (GUI) displaying the quality of contact of the balloon catheter in a pre-ablation phase, immediately before the ablation. Additional examples provide a GUI indicating the achieved quality of ablation in a post-ablation phase.

In the pre-ablation phase, the ablation system measures and computes a number of individual contact quality indicators, such as the electrical impedance between each electrode and the patient's tissue, and the local temperature at each electrode. These individual contact quality indicators are combined into one or more global contact quality measures, such as a mean of the measured electrical impedances and/or a variability of the measured electrical impedances. Other global contact quality measures may include a minimum of the measured temperatures, a maximum of the measured temperatures, and/or a variability of the measured temperatures. A processor compares these global contact quality measures to a predefined global contact quality criterion, which comprises one or more thresholds, for example. The result of this comparison indicates a global quality of contact of the balloon catheter.

The GUI presents on a display an image of the balloon catheter and superimposes on this image an icon indicating the global quality of contact, for example using "traffic light" colors of green, yellow and red. (Alternatively, other color or shading schemes may be used.) The icon is green if all of the global contact quality measures satisfy the global contact quality criterion, indicating that the balloon catheter is evidently properly aligned in the ostium, and the electrodes are in proper contact with the tissue. If not all these conditions are satisfied, the catheter is probably misaligned in the ostium, at least some of the electrodes do not meet the criteria for good contact, and a satisfactory ablation by these electrodes is unlikely. In this case a yellow icon is displayed. A red icon is displayed if at least one of the global contact quality measures is beyond a predefined "safety" threshold, to advise against performing the ablation due to potential danger to the patient. Additionally, the GUI may indicate which of the electrodes are in poor or no contact with the ostium when the yellow or red alignment icon appears.

For the post-ablation phase, the ablation system measures and keeps track of the same individual contact quality indicators as in the pre-ablation phase. The values of these parameters during the ablation are compared to predefined thresholds in order to establish whether the ablation was successful or whether it failed at any of the electrodes. The GUI displays, similarly to the pre-ablation phase, an image of the balloon catheter with icons indicating success or failure of the ablation at each of the electrode.

In the disclosed examples, a probe comprising multiple electrodes is inserted in a body cavity of a patient so as to bring the multiple electrodes into contact with tissue in the body cavity. A processor assesses one or more individual contact quality indicators for the contact of each of the multiple electrodes with the tissue, computes one or more global contact quality measures based on the contact quality indicators of the electrodes, and compares the global contact quality measures to a predefined global contact quality criterion. The processor further displays on a display screen an icon indicating whether the global contact quality measures satisfy the predefined global contact quality contact criterion.

SYSTEM DESCRIPTION

FIG. 1 is a schematic pictorial illustration of a medical apparatus 20 in the course of an RFA procedure, in accordance with an example of the disclosure. A physician 22 performs the RFA procedure on a patient 24, using an ablation catheter 26, with further details of the catheter described hereinbelow. The example shown in the figures refers to an RFA procedure on an ostium 21 of the pulmonary vein of a heart 27 using a balloon 32. In alternative examples, the RFA procedure may be performed using other types of catheters having multiple electrodes and may be performed not only in heart 27, but also in other organs and tissue, as will be apparent to those skilled in the art after reading the present description. Further alternatively, apparatus 20 may be used, mutatis mutandis, in IRE ablation or in other procedures using multiple electrodes to contact tissue simultaneously.

As shown in an inset 36, ablation catheter 26 comprises a shaft 28 and a distal assembly 30, wherein the shaft functions as an insertion tube for inserting the distal assembly into a body cavity patient 24, in this case into the chamber of heart 27. Distal assembly 30 comprises balloon 32 with multiple ablation electrodes 34 arrayed around the surface of the balloon. In the present example, distal assembly 30 also comprises temperature sensors 33 within or adjacent to the areas of electrodes 34. Distal assembly 30 and a part of shaft 28 are also shown in an inset 38. In alternative examples, distal assembly 30 may comprise a structure different from a balloon.

Two modes of RFA may be used: unipolar RFA and bipolar RFA. In unipolar RFA, the ablation currents flow between ablation electrodes 34 and an external electrode, referred to as a "return patch" 66, which is coupled externally between patient 24, typically on the skin of the subject's torso, and an electrical signal generator 44. In bipolar RFA, the currents flow between selected pairs of electrodes 34.

A controller 42 and electrical signal generator 44 typically reside in a console 46; the controller and the signal generator may each comprise one or several circuit components. Catheter 26 is connected to console 46 via an electrical interface 48, such as a port or socket, through which RF signals are carried from signal generator 44 to distal assembly 30.

Controller 42 receives from physician 22 (or another operator), prior to and/or during the ablation procedure, setup parameters for the procedure. For example, using one or more suitable input devices, such as a keyboard, mouse, or touch screen (not shown), physician 22 defines the electrical and temporal parameters of the RFA signals to be applied to selected segments of electrodes 34. Controller 42 passes suitable control signals to signal generator 44 for performing the RFA.

Controller 42 measures the electrical impedance between each electrode 34 and tissue of heart 27 (for example by measuring the impedance between the respective electrode and return patch 66) as an individual contact quality indicator. Controller 42 also measures the temperature at each electrode 34 through a respective temperature sensor 33 as a further individual contact quality indicator. Controller 42 displays on a display screen 58 an image 60 of balloon 30, on which it superimposes, based on the measured impedances and temperatures before and during the ablation procedure, one or more icons reflecting the global quality of contact of the electrodes with the tissue, as will be detailed hereinbelow.

Controller 42 may track the respective positions of electrodes 34 during the RFA procedure, as well as during electrophysiological signal acquisition, using any suitable tracking technique. For example, distal assembly may comprise one or more electromagnetic position sensors (not shown), which, in the presence of an external magnetic field generated by one or more magnetic-field generators 50, output signals that vary with the positions of the sensors. Based on these signals, controller 42 computes the position coordinates of electrodes 34. Magnetic-field generators 50 are connected to console 46 via cables 52 and an interface 54. Alternatively or additionally, for each electrode 34, controller 42 may ascertain the respective impedances between the electrode and multiple external electrodes 56 coupled to patient 24 at various different locations, and then compute the locations of the electrodes based on the ratios between these impedances. The controller may use both electromagnetic tracking and impedance-based tracking, as described, for example, in U.S. Pat. No. 8,456,182, whose disclosure is incorporated herein by reference.

Controller 42 and electrical signal generator 44 typically comprise both analog and digital elements. Thus, controller 42 comprises an analog front-end with multiple inputs with respective analog-to-digital converters (ADCs) for monitoring the RF ablation signals applied by signal generator 44 to each of electrodes 34, as well as measuring electrical impedances and temperatures as described hereinabove. Controller 42 further comprises a memory 43 for storing measured values of impedance and temperature. Controller 42 also comprises multiple digital output circuits for sending commands to signal generator 44 for adjusting the RF signals.

Electrical signal generator 44 typically comprises RF analog circuits for generating and amplifying the RF signals for ablation, as well as digital input circuits for receiving digital control signals from controller 42. Alternatively, the control signals may be passed from controller 42 to electrical signal generator 44 in an analog form, provided that the controller and the signal generator are configured accordingly.

Typically, the functionality of controller 42, as described herein, is implemented at least partly in software. For example, controller 42 may comprise a programmed digital computing device comprising at least a central processing unit (CPU) and random-access memory (RAM). Program code, including software programs, and/or data are loaded into the RAM for execution and processing by the CPU. The program code and/or data may be downloaded to the controller in electronic form, over a network, for example. Alternatively or additionally, the program code and/or data may be provided and/or stored on non-transitory tangible media, such as magnetic, optical, or electronic memory. Such program code and/or data, when provided to the controller, produce a machine or special-purpose computer, configured to perform the tasks described herein.

At the start of the RFA procedure, physician 22 inserts catheter 26 through a sheath 62 into heart 27, with balloon 32 in a collapsed configuration. Only after the catheter exits the sheath is the balloon inflated to its intended functional shape with a fluid that flows into the balloon through shaft 28. This functional shape is shown in insets 36 and 38. By containing balloon 32 in a collapsed configuration, sheath 62 also serves to minimize vascular trauma while the balloon is brought to the target location. Physician 22 navigates catheter 26 to a target location in heart 27 of patient 24, by manipulating the catheter, using a manipulator 64 near the proximal end of the catheter, and/or deflection of sheath 62. Physician 22 brings distal assembly 30 into contact with the tissue of ostium 21 of the pulmonary vein of heart 27.

Once distal assembly 30 is in contact with the tissue in the pre-ablation phase, controller 42 measures impedances and temperatures of electrodes 34, either automatically or at a command from physician 22. Based on these measurements, controller 42 computes one or more global contact quality measures across the electrodes (for example average impedance, impedance variability, minimum and maximum temperatures, and/or temperature variability). Controller 42 compares these global contact quality measures to a predefined global contact quality criterion, which comprises one or more thresholds, and, based on the results of the comparison, displays an icon indicating the global quality of contact of the distal assembly in ostium 21, as further detailed in FIGS. 2A and 2B hereinbelow. Based on the displayed global quality of contact, physician 22 decides whether to proceed with the ablation or whether to improve on the alignment of distal assembly 30 so as to achieve better contact between electrodes 34 and the tissue of ostium 21. Once physician 22 is satisfied with the alignment, he/she initiates the ablation by actuating electrical signal generator 44, under control of controller 42, to generate RFA signals, which are carried through catheter 26 through different respective wires to electrodes 34.

During the ablation, controller 42 measures the electrical impedances and temperatures of respective electrodes 34 and stores them in memory 43. After completing the ablation, controller 42 displays on screen 58 an indication of the quality of the ablation, as further detailed in FIGS. 3A and 3B hereinbelow.

FIGS. 2A-2D are schematic representations of graphical windows on display screen 58, indicating the global quality of contact of distal end 30 of ablation catheter 26 with ostium 21 of heart 27, in accordance with an example of the disclosure.

Each of FIGS. 2A-2C shows a schematic axial view 100 of balloon 32 with its electrodes 34. In the displayed example, balloon 32 comprises ten electrodes 34, numbered 1-10 in view 100. (In alternative examples, other types of catheters having various numbers of electrodes may be used.) Axial view 100 additionally comprises icons 102, 104, and 106 in respective FIGS. 2A, 2B, and 2C at the center of the axial view, indicating the quality of contact of distal end 30. The quality of contact is determined in this example by grouping the impedance range and impedance variability across electrodes 34, as well as electrode temperatures and temperature variability across the electrodes, to serve as a global contact quality measure, as shown in Table 1, hereinbelow. The global contact quality measure is compared to a predefined global contact quality criterion, which comprises a combination of thresholds for the impedance and temperature measurements, further detailed in Table 1. The comparison of the global contact quality measure to the global contact quality criterion determines the global quality of contact, as shown in Table 1.

TABLE 1

Contact of distal end 30 in ostium 21

| | | "Some electrodes not in proper contact - check catheter alignment" | |
|---|---|---|---|
| Message to the physician | "All electrodes in proper contact" | | "Hazard - do NOT proceed to ablation - re-align catheter" |
| Color of icon (global quality of contact) | Green | Yellow | Red |
| Shown in Condition | FIG. 2A All conditions satisfied | FIG. 2B At least one condition below satisfied (not all "green" conditions satisfied) | FIG. 2C One impedance condition and one temperature condition beyond respective threshold |
| Global contact quality measure: | | Global contact quality criterion: | |
| Impedance range | 90-110 Ω | 110-120 Ω | >120 Ω |
| Impedance variability across electrodes | ≤20 Ω | >20 Ω | >40 Ω |
| Electrode temperature | ≤31° C. | >31° C. | <25° C. |
| Electrode temperature variability | ≤3° C. | >3° C. | >6° C. |

Green icon 102 (FIG. 2A) indicates that all electrodes 34 are in proper contact with the tissue of ostium 21, and that physician 22 can go ahead with the RF ablation. The icons representing all of electrodes 34 have borders indicating that they are in good contact with the tissue.

Yellow icon 104 (FIG. 2B) indicates that one or more of electrodes 34 do not satisfy the conditions for a good contact, and that it is recommended to physician 22 to check the alignment of distal end 30 before beginning ablation. This recommendation may be further emphasized with a written message, such as "Check" in icon 104. The borders are absent from the icons representing electrodes 3, 8 and 9, indicating that these electrodes are problematic.

Red icon 106 (FIG. 2C) indicates that at least one electrode 34 is separated from the tissue with a layer of blood between the electrode and the tissue. As performing the RF ablation in this situation may cause coagulation of the blood surrounding the electrode and a concomitant blood clot in the circulatory system, physician 22 is instructed not to go ahead with the ablation, but rather to re-align distal end 30 in order to prevent a hazardous situation. A warning text such as "Realign" in icon 106 further emphasizes the request.

FIG. 2D shows a bar chart 108 of the measured impedance and temperature for each of the electrodes, shown as bars 114 and 116 against a respective impedance axis 110 and temperature axis 112. Horizontal black/white bar 118 contains the numbers of electrodes 34 and indicates which of the electrodes do not have proper contact with the tissue (white=good contact; black=bad contact.) Thus, in the displayed chart 108, electrodes 3, 8, and 9 do not have a good contact with the tissue. This information may assist physician 22 in re-aligning distal end 30 in order to achieve good contact for all electrodes 34.

Figure 3A:
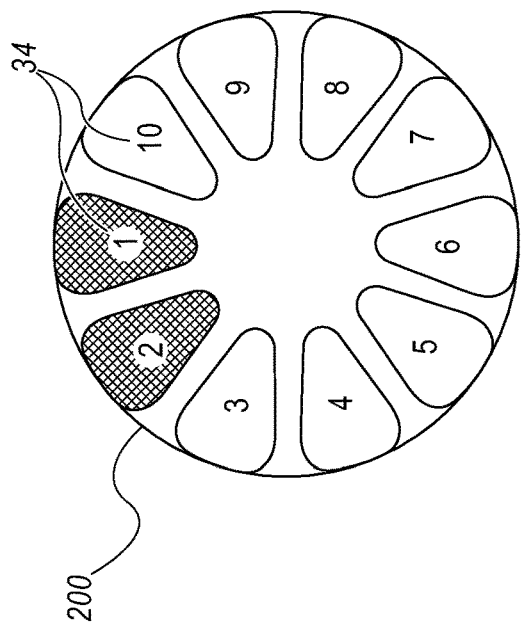
FIGS. 3A and 3B are schematic representations of graphical windows on a display screen, in accordance with another example of the disclosure.
Figure 3B:
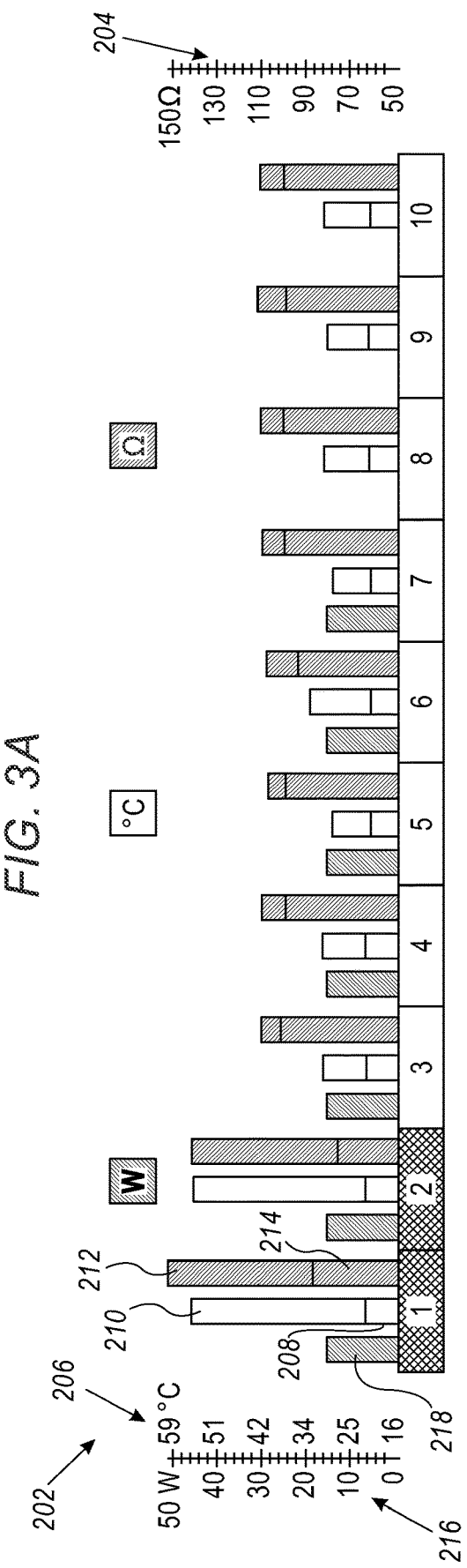

FIGS. 3A and 3B are schematic representations of graphical windows on display screen 58 indicating the quality a completed RF ablation procedure, in accordance with an example of the disclosure.

During the ablation procedure, controller 42 continuously measures and stores in memory 43 the impedance and temperature values of each electrode 34. At the end of the ablation, controller 42 analyzes the stored impedance and temperature data, and determines, based on the criteria shown in Table 2 hereinbelow, whether the ablation at a given electrode may be suspected of having produced an unacceptable lesion, i.e., a lesion that might reach deep into the tissue and thus pose a danger in some areas of the pulmonary vein, such as its posterior wall.

TABLE 2

Post-ablation indicators for suspect ablations

| | |
|---|---|
| Impedance drop during ablation | >30 Ω |
| Maximum electrode temperature during ablation | ≥55° C. |

Controller 42 displays the results of the analysis in the GUI on screen 58 in two forms (FIG. 3A and FIG. 3B):

FIG. 3A shows, similarly to FIGS. 2A-2C, a schematic axial view 200 of balloon 32 with its electrodes 34. Those electrodes, for which the temperature during the ablation exceeded 55° C., are colored red.

FIG. 3B shows a bar chart 202 of the range of the measured impedance and temperature for each of electrodes 34 during the ablation against respective impedance axis 204 and temperature axis 206. Thus, for example, for electrode #1, the temperature at the start of the ablation is shown as the top of a bar 208, whereas the maximum temperature during the ablation is shown as the top of a bar 210. The impedance range for electrode #1 during the ablation is indicated with the starting impedance as the top of a bar 212 and the end impedance as the top of a bar 214.

In addition to the impedance and temperature ranges, the RF power applied to each of the electrodes is shown against a power axis 216. Thus, for example, the power applied to electrode #1 is shown as a bar 218.

By marking in FIG. 3A those electrodes that experienced impedance and temperature swings during the ablation beyond predefined thresholds (for example as listed in Table 2), the markings, together with the graphical representations in FIG. 3B, may assist physician 22 in judging whether the ablations at specific electrodes are suspect. For example, in the illustrated embodiment, electrodes #1 and #2 are marked (shaded or colored) in both FIGS. 3A and 3B to indicate the large temperature swings seen in FIG. 3B. Alternatively, the electrodes may be marked by different shadings, representing different respective values of impedance drop or temperature rise for each electrode. This may further assist physician 22 to judge whether the ablation procedure succeeded in producing an acceptable lesion around ostium 21.

Figure 4:
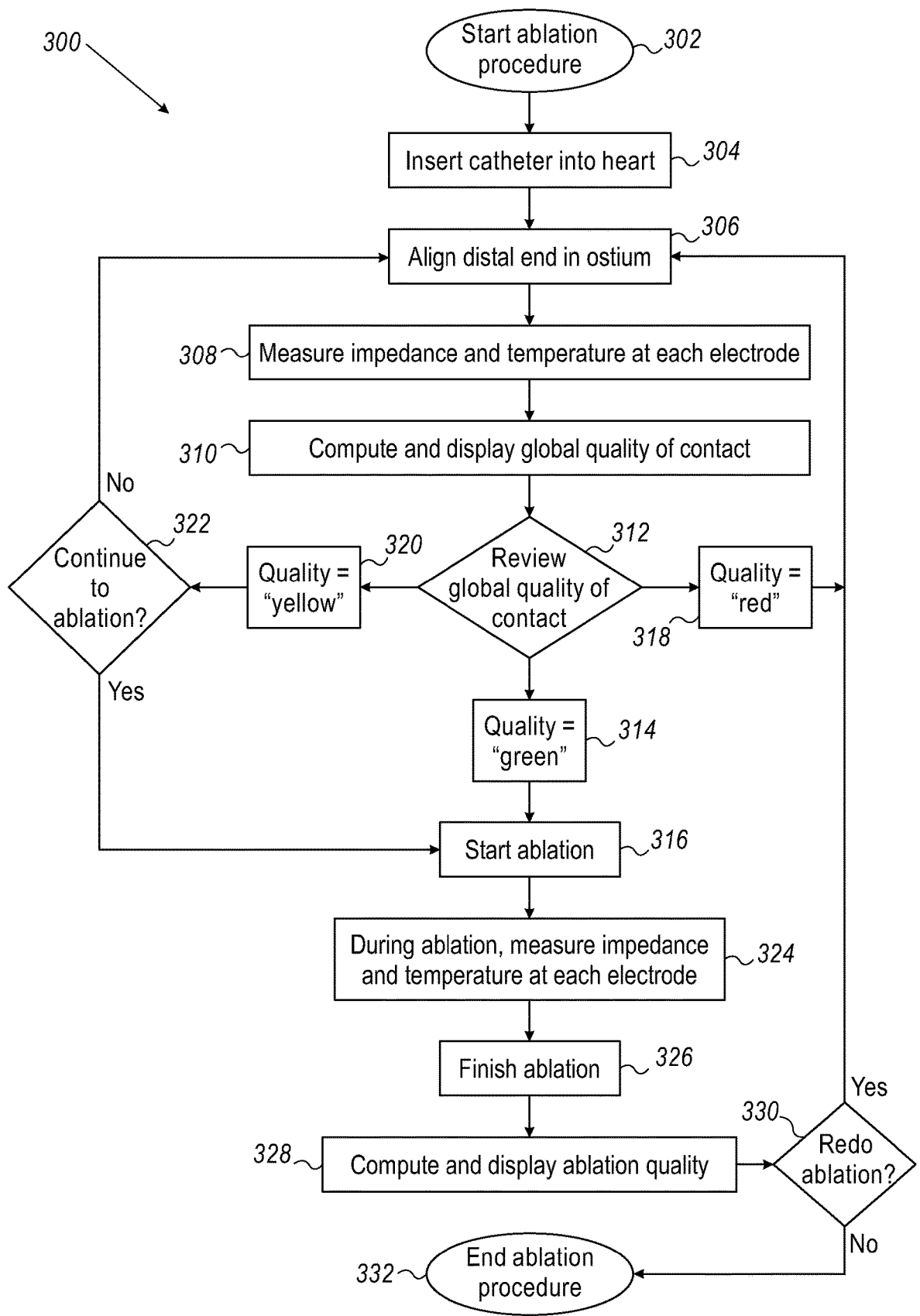
FIG. 4 is a flowchart that schematically illustrates a method for displaying a global quality indicator during an ablation procedure, in accordance with an example of the disclosure.

FIG. 4 is a flowchart 300 that schematically illustrates a method for displaying a global quality indicator during an ablation procedure, in accordance with an example of the disclosure.

The ablation procedure starts in a start step 302. In an insertion step 304, catheter 26 is inserted into heart 27. In an alignment step 306, distal end 30 of catheter 26 is aligned in ostium 21 so as to bring all electrodes 34 into contact with the tissue of the ostium. In a pre-ablation measurement step 308, controller 42 measures the impedance and temperature of each electrode 34. In a pre-ablation display step 310, controller 42 computes and displays the global quality of contact on screen 58 as shown in FIGS. 2A-2D hereinabove. In addition, controller 42 may also compute and display one or more clinical contact quality measures with respect to the alignment of catheter 26 in heart 27. For example, controller 42 may assess how well the axis of balloon 32 is aligned with the axis of the pulmonary vein whose ostium is to be ablated. This alignment may be assessed by fluoroscopy or other imaging modalities, for instance.

In a contact review step 312, physician 22 reviews the global quality of contact. The different options for the contact quality, green, yellow, and red, are shown in respective boxes 314, 320, and 318. If the global quality of contact is "green" (FIG. 2A), physician 22 proceeds directly to ablation start step 316. If the global quality of contact is "red" (FIG. 2C), physician does not initiate the ablation due to a potentially hazardous condition, but rather returns to alignment step 306. If the global quality of contact is "yellow" (FIG. 2B), physician 22 decides in a decision step 322, possibly with the help of bar chart 108 (FIG. 2D) indicating the status and contact quality of individual electrodes 34, whether to re-align distal end by returning to alignment step 306, or to proceed with the ablation in ablation start step 316.

After ablation start step 316, during the ablation, controller 42 measures continuously and stores in memory 43 the impedance and temperature values of each electrode 34. The ablation concludes at an ablation finish step 326. In a post-ablation display step 328, controller 42 computes and displays on screen 58 the electrode-by-electrode quality of the ablation, as detailed in FIGS. 3A and 3B. In an ablation redo decision step 330, physician 22 decides, based on the results displayed in step 328, whether the ablation should be redone. If physician 22 decides to redo the ablation, he/she returns to alignment step 306; if he/she is satisfied with the results of the ablation, he/she finishes the procedure in an end step 332.

EXAMPLES

Example 1. An apparatus (20) for medical treatment, comprising a probe (26) comprising multiple electrodes (34) and configured to be inserted in a body cavity of a patient (24) so as to bring the multiple electrodes into contact with tissue in the body cavity; a display screen (58); and a processor (42) configured to assess one or more individual contact quality indicators with respect to the contact between each of the multiple electrodes and the tissue, to compute one or more global contact quality measures based on the individual contact quality indicators of the multiple electrodes, to compare the one or more global contact quality measures to a predefined global contact quality criterion, and to display on the display screen an icon (102, 104, 106) indicating whether the global contact quality measures satisfy the predefined global contact quality criterion.

Example 2. The apparatus according to example 1, wherein the one or more individual contact quality indicators comprise an electrical impedance measured between each of the multiple electrodes and the tissue.

Example 3. The apparatus according to example 2, wherein the one or more global contact quality measures comprise at least one measure selected from a group consisting of a mean of the measured electrical impedances and a variability of the measured electrical impedances.

Example 4. The apparatus according to example 1, and wherein the probe comprises multiple temperature sensors associated with the electrodes, and wherein the individual contact quality indicators comprise a temperature measured by each of the multiple temperature sensors.

Example 5. The apparatus according to example 4, wherein the one or more global contact quality measures comprise at least one measure selected from a group consisting of a minimum of the measured temperatures, a maximum of the measured temperatures, and a variability of the measured temperatures.

Example 6. The apparatus according to example 1, wherein the predefined global contact quality criterion comprises one or more thresholds, to which the processor compares the one or more global quality measures.

Example 7. The apparatus according to example 6, wherein the one or more thresholds are selected from a group consisting of a mean electrical impedance threshold, an electrical impedance variability threshold, a temperature threshold, and a temperature variability threshold.

Example 8. The apparatus according to example 1, wherein the icon is colored responsively to a comparison between the global contact quality measures and the predefined global contact quality criterion.

Example 9. The apparatus according to example 8, wherein the processor is configured to apply a first color to the icon when the global contact quality measures satisfy the predefined global contact quality criterion, to apply a second color to the icon when the global contact quality measures do not fully satisfy the predefined global contact quality criterion, and to apply a third color to the icon when the global contact quality measures fall outside a predefined safety range.

Example 10. The apparatus according to example 1, wherein the probe comprises a balloon, wherein the multiple electrodes are disposed around a circumference of the balloon.

Example 11. The apparatus according to example 1, and comprising an electrical signal generator, which is configured to apply radio frequency (RF) energy simultaneously to the multiple electrodes with energy sufficient to ablate the tissue contacted by the electrodes.

Example 12. The apparatus according to example 11, wherein the controller is configured to measure, while applying the RF energy to the multiple electrodes, an electrical impedance between each of the multiple electrodes and the tissue and a temperature at each of the multiple electrodes, and to compute a respective ablation quality measure for each of the multiple electrodes responsively to the measured impedance and temperature.

Example 13. The apparatus according to example 12, wherein the controller is configured to display the respective ablation quality measure for each of the multiple electrodes on the display screen.

Example 14. A method for displaying information, comprising providing a probe (26) comprising multiple electrodes (34) and configured to be inserted in a body cavity of a patient (24) so as to bring the multiple electrodes into contact with tissue in the body cavity; while the probe is in the body cavity, assessing one or more individual contact quality indicators with respect to the contact between each of the multiple electrodes and the tissue; computing one or more global contact quality measures based on the individual contact quality indicators of the multiple electrodes; comparing the one or more global contact quality measures to a predefined global contact quality criterion; and displaying on a display screen (58) an icon (102, 104, 106) indicating whether the global contact quality measures satisfy the predefined global contact quality criterion.

Various features of the disclosure which are, for clarity, described in the contexts of separate examples may also be provided in combination in a single example. Conversely, various features of the disclosure which are, for brevity, described in the context of a single example may also be provided separately or in any suitable sub-combination.

It will be appreciated that the examples described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. An apparatus for medical treatment, comprising:
   a probe comprising multiple electrodes and configured to be inserted in a body cavity of a patient so as to bring the multiple electrodes into contact with tissue in the body cavity;
   a display screen;
   a processor configured to assess one or more individual contact quality indicators with respect to the contact between each of the multiple electrodes and the tissue, wherein the one or more individual contact quality indicators comprise an electrical impedance measured between each of the multiple electrodes and the tissue, to compute one or more global contact quality measures based on the individual contact quality indicators of the multiple electrodes, to compare the one or more global contact quality measures to a predefined global contact quality criterion, and to display on the display screen an icon indicating whether the global contact quality measures satisfy the predefined global contact quality criterion; and
   an electrical signal generator, which is configured to, based on one or more control signals received from the processor, apply radio frequency (RF) energy simultaneously to the multiple electrodes with energy sufficient to ablate the tissue contacted by the electrodes, the processor being further configured to adjust the RF energy applied to the multiple electrodes, wherein the processor is configured to measure, while applying the RF energy to the multiple electrodes, the electrical impedance between each of the multiple electrodes and the tissue, and to compute a respective ablation quality measure for each of the multiple electrodes responsively at least in part to the measured impedance, and to display on the display screen one or more icons indicating success or failure of the ablation at each of the electrodes.

2. The apparatus according to claim 1, wherein the one or more global contact quality measures comprise at least one measure selected from a group consisting of a mean of the measured electrical impedances and a variability of the measured electrical impedances.

3. The apparatus according to claim 1, and wherein the probe comprises multiple temperature sensors associated with the electrodes, and wherein the individual contact quality indicators comprise a temperature measured by each of the multiple temperature sensors.

4. The apparatus according to claim 3, wherein the one or more global contact quality measures comprise at least one measure selected from a group consisting of a minimum of the measured temperatures, a maximum of the measured temperatures, and a variability of the measured temperatures.

5. The apparatus according to claim 1, wherein the predefined global contact quality criterion comprises one or more thresholds, to which the processor compares the one or more global quality measures.

6. The apparatus according to claim 5, wherein the one or more thresholds are selected from a group consisting of a mean electrical impedance threshold, an electrical impedance variability threshold, a temperature threshold, and a temperature variability threshold.

7. The apparatus according to claim 1, wherein the icon is colored responsively to a comparison between the global contact quality measures and the predefined global contact quality criterion.

8. The apparatus according to claim 7, wherein the processor is configured to apply a first color to the icon when the global contact quality measures satisfy the predefined global contact quality criterion, to apply a second color to the icon when the global contact quality measures do not fully satisfy the predefined global contact quality criterion, and to apply a third color to the icon when the global contact quality measures fall outside a predefined safety range.

9. The apparatus according to claim 1, wherein the probe comprises a balloon, wherein the multiple electrodes are disposed around a circumference of the balloon.

10. The apparatus according to claim 1, wherein the processor is configured to measure, while applying the RF energy to the multiple electrodes, a temperature at each of the multiple electrodes, and to compute a respective ablation quality measure for each of the multiple electrodes responsively to the measured impedance and temperature.

11. The apparatus according to claim 10, wherein the processor is configured to display the respective ablation quality measure for each of the multiple electrodes on the display screen.

12. A method for displaying information, comprising:
   providing a probe comprising multiple electrodes and configured to be inserted in a body cavity of a patient so as to bring the multiple electrodes into contact with tissue in the body cavity;
   while the probe is in the body cavity, assessing one or more individual contact quality indicators with respect to the contact between each of the multiple electrodes and the tissue, wherein the one or more individual contact quality indicators comprise an electrical impedance measured between each of the multiple electrodes and the tissue;

computing one or more global contact quality measures based on the individual contact quality indicators of the multiple electrodes;

comparing the one or more global contact quality measures to a predefined global contact quality criterion;

displaying on a display screen an icon indicating whether the global contact quality measures satisfy the predefined global contact quality criterion;

applying radio frequency (RF) energy simultaneously to the multiple electrodes with energy sufficient to ablate the tissue contacted by the electrodes;

measuring, while applying the RF energy to the multiple electrodes, the electrical impedance between each of the multiple electrodes and the tissue;

computing a respective ablation quality measure for each of the multiple electrodes responsively at least in part to the measured impedance; and displaying on the display screen one or more icons indicating success or failure of the ablation at each of the electrodes.

13. The method according to claim 1, wherein computing the one or more global contact quality measures comprises computing at least one measure selected from a group consisting of a mean of the measured electrical impedances and a variability of the measured electrical impedances.

14. The method according to claim 12, wherein assessing the one or more individual contact quality indicators comprise measuring respective temperatures at the electrodes.

15. The method according to claim 14, wherein computing one or more global contact quality measures comprises computing at least one measure selected from a group consisting of a minimum of the measured temperatures, a maximum of the measured temperatures, and a variability of the measured temperatures.

16. The method according to claim 12, wherein comparing the one or more global contact quality measures comprises comparing the one or more global contact quality measures to one or more thresholds.

17. The method according to claim 16, wherein the one or more thresholds are selected from a group consisting of a mean electrical impedance threshold, an electrical impedance variability threshold, a temperature threshold, and a temperature variability threshold.

18. The method according to claim 12, wherein displaying the icon comprises coloring the icon responsively to a comparison between the global contact quality measures and the predefined global contact quality criterion.

19. The method according to claim 18, wherein coloring the icon comprises applying a first color to the icon when the global contact quality measures satisfy the predefined global contact quality criterion, applying a second color to the icon when the global contact quality measures do not fully satisfy the predefined global contact quality criterion, and applying a third color to the icon when the global contact quality measures fall outside a predefined safety range.

20. The method according to claim 12, and comprising measuring, while applying the RF energy to the multiple electrodes a temperature at each of the multiple temperature sensors, and computing a respective ablation quality measure for each of the multiple electrodes responsively to the measured impedance and temperature.

21. The method according to claim 20, comprising displaying the respective ablation quality measure for each of the multiple electrodes on the display screen.

22. The method according to claim 12, comprising computing and displaying one or more clinical contact quality measures with respect to an alignment of the probe in the body cavity.

23. An apparatus for medical treatment, comprising:
a probe comprising multiple electrodes and configured to be inserted in a body cavity of a patient so as to bring the multiple electrodes into contact with tissue in the body cavity;
a display screen;
a processor configured:
to assess one or more individual contact quality indicators with respect to the contact between each of the multiple electrodes and the tissue, wherein the one or more individual contact quality indicators comprise an electrical impedance measured between each of the multiple electrodes and the tissue,
to compute one or more global contact quality measures based on the individual contact quality indicators of the multiple electrodes,
to compare the one or more global contact quality measures to a predefined global contact quality criterion, and
to display on the display screen an icon selected from a plurality of icons, the plurality of icons comprising:
a first icon indicating the one or more global contact quality measures satisfy the predefined global contact quality criterion,
a second icon indicating the one or more global contact quality measures do not fully satisfy the predefined global contact quality criterion, and
a third icon indicating the global contact quality measures fall outside a predefined safety range; and
an electrical signal generator, which is configured to, based on one or more control signals received from the processor, apply radio frequency (RF) energy simultaneously to the multiple electrodes with energy sufficient to ablate the tissue contacted by the electrodes, the processor being further configured to adjust the RF energy applied to the multiple electrodes, wherein the processor is configured to measure, while applying the RF energy to the multiple electrodes, the electrical impedance between each of the multiple electrodes and the tissue, and to compute a respective ablation quality measure for each of the multiple electrodes responsively, at least in part to the measured impedance, and to display on the display screen the respective ablation quality measure for each of the multiple electrodes on the display screen.

\* \* \* \* \*